United States Patent

Hino

[11] 4,242,873
[45] Jan. 6, 1981

[54] HEAT PUMP TYPE HEATING AND COOLING SOURCE SYSTEM

[75] Inventor: Toshiyuki Hino, Tokyo, Japan

[73] Assignee: Kajima Kensetsu Kabushiki Kaisha, Tokyo, Japan

[21] Appl. No.: 51,030

[22] Filed: Jun. 22, 1979

Related U.S. Application Data

[63] Continuation-in-part of Ser. No. 812,314, Jul. 1, 1977, abandoned.

[51] Int. Cl.³ .................. F25B 27/00; F25B 27/02; F25B 13/00
[52] U.S. Cl. .................. 62/2; 62/238 E; 62/324 D
[58] Field of Search .......... 62/2, 238, 324; 237/1 A; 126/271

[56] References Cited

U.S. PATENT DOCUMENTS

| | | | |
|---|---|---|---|
| 3,986,664 | 10/1976 | Gustafsson | 62/238 |
| 3,991,938 | 11/1976 | Ramey | 62/238 |
| 3,996,759 | 12/1976 | Meckler | 62/2 |
| 4,015,962 | 4/1977 | Tompkins | 62/2 |
| 4,061,131 | 12/1977 | Bohanan | 126/271 |
| 4,066,118 | 1/1978 | Goettl | 62/2 |
| 4,070,870 | 1/1978 | Bahel et al. | 62/2 |

Primary Examiner—Lloyd L. King
Attorney, Agent, or Firm—Fidelman, Wolffe & Waldron

[57] ABSTRACT

A heat pump type heating and cooling source system in which a heat collecting and radiating panel is connected in a primary medium circulating circuit arranged for heat exchange relation with a secondary medium circulating circuit including an indoor air-conditioning unit. The heat collecting and radiating panel is disposed outdoors to stand substantially normal to the horizontal and is oriented to extend from east to west, and surface treatment is applied to improve the rate of heat radiation.

5 Claims, 7 Drawing Figures

HEAT PUMP TYPE HEATING AND COOLING SOURCE SYSTEM

This application is a continuation-part of Ser. No. 812,314, filed July 1, 1977, now abandoned.

BACKGROUND OF THE INVENTION

This invention relates to a heat pump type heating and cooling source system, and more particularly to an outdoor unit of such a system and to improvements therein.

The outdoor unit disclosed in prior art systems is featured by the fact that the heat collecting and radiating panel or plate is disposed at such an angle that the rays of the sun pass substantially in parallel with the plate without falling thereupon at the southing time in the summer season but are substantially fully received by the plate at the southing time in the winter season. Such an angular arrangement provides a satisfactory efficiency although it is fixed and is not variable. However, due to the fact that this outdoor unit is generally disposed on a location such as the roof of a house, considerable difficulty is encountered in the maintenance thereof, and the adverse effect of dust and dirt accumulating on the surface of the heat collecting and radiating plate is not negligible too. Further, special supporting means must also be provided for maintaining the heat collecting and radiating plate in its slanted mounted position.

SUMMARY OF THE INVENTION

With a view to obviate such disadvantages, it is a primary object of the present invention to provide improvements in the proposed heat pump type air conditioning system. According to the heat pump type heating and cooling system of the present invention, the heat collecting and radiating plate in the outdoor unit is disposed to stand sunstantially normal to the horizontal. Thus, undesirable accumulation of dust and dirt on the heat collecting and radiating plate is eliminted so that the operating efficiency of the outdoor unit will not change appreciably from the initial design condition. In other words, the maintenance-free heat collecting and radiating plate is remarkably advantageous for use in the outdoor unit of this kind which is disposed on a location with which difficulty is generally encountered for maintenance. Further, the substantially normal arrangement of the heat collecting and radiating plate provides such an additional advantage that it ensures satisfactory natural convection of air due to the air temperature.

In a conventional fin-coil system using a forced draft fan, excessive deposition of frost between the fins tending to completely shut off the draft is inevitable, and defrosting operation must be frequently repeated when the outdoor air temperature is lower than, for example, about $-2°$ C. to $-5°$ C. and the relative humidity is high during the heat collecting operation for collecting heat from outdoor heat sources. The system according to the present invention is excellent over the conventional fin-coil system in that frost deposits at a quite slower rate, and the adverse effect due to the deposition of frost is less appreciable since the amount of thermal flux per unit area of the heat collecting and radiating plate is small. This is evident from the fact that a defrosting interval required for a cooling coil of natural convection type in a cold-storage warehouse is about several ten days, whereas such an interval is generally about several hours in the case of a cooling coil of forced draft type. The length of time required for defrosting is also shorter in the case of the present invention than in the conventional system since the frost can be easily dropped off the heat collecting and radiating plate by gravity.

The system according to the present invention is further advantageous in that the fan noise is eliminated in both the heat collecting operation and the heat radiating operation. The system according to the present invention has such an additional advantage that it can reliably operate even in an area of extremely severe external conditions such as a desert raged with a sandstorm because the outdoor unit is quite simple in construction.

The present invention is further characterized by the fact that the surface of the heat collecting and radiating plate is treated with a coating material such as black or white paint providing an improved effect of heat radiation, and that the plate is oriented to extend from east to west. This improved effect of heat radiation refers to facilitation of absorption of solar radiation and heat form heat sources on the ground during the heat absorption cycle and to a better rate of radiation of infrared rays from the heat collecting and radiating plate itself during the heat radiation cycle. For example, black or similar coating is suitable for the dual purpose of heat absorption and heat radiation since it exhibits a satisfactory heat absorption rate (=heat radiation rate) of the order of 0.9 in both the visible and infrared spectrum ranges. On the other hand, white or similar coating is suitable for the exclusive purpose of heat radiation since it exhibits a low heat absorption (radiation) rate of the order of 0.1 to 0.2 in the visible spectrum range and a high heat absorption (radiation) rate of the order of 0.9 in the infrared spectrum range.

The heat collecting and radiating plate is oriented to extend from east to west and stands substantially normal to the horizontal, so that continuous absorption of the energy of solar radiation can be effected from the morning to the evening in the winter season in which the altitude of the sun is low, and the energy of the solar radiation falling upon the heat collecting and radiating plate can be reduced in the summer season in which the altitude of the sun is high.

It is further object to provide a refrigerant medium which is circulated in the radiation member at an evaporation temperature in the range of from about $-10°$ C. to $20°$ C. in the winter season for the heating cycle and at a condensation temperature of from about $30°$ C. to $60°$ C. in the summer season for the cooling cycle.

DESCRIPTION OF THE PREFERRED EMBODIMENTS

Figure 1:
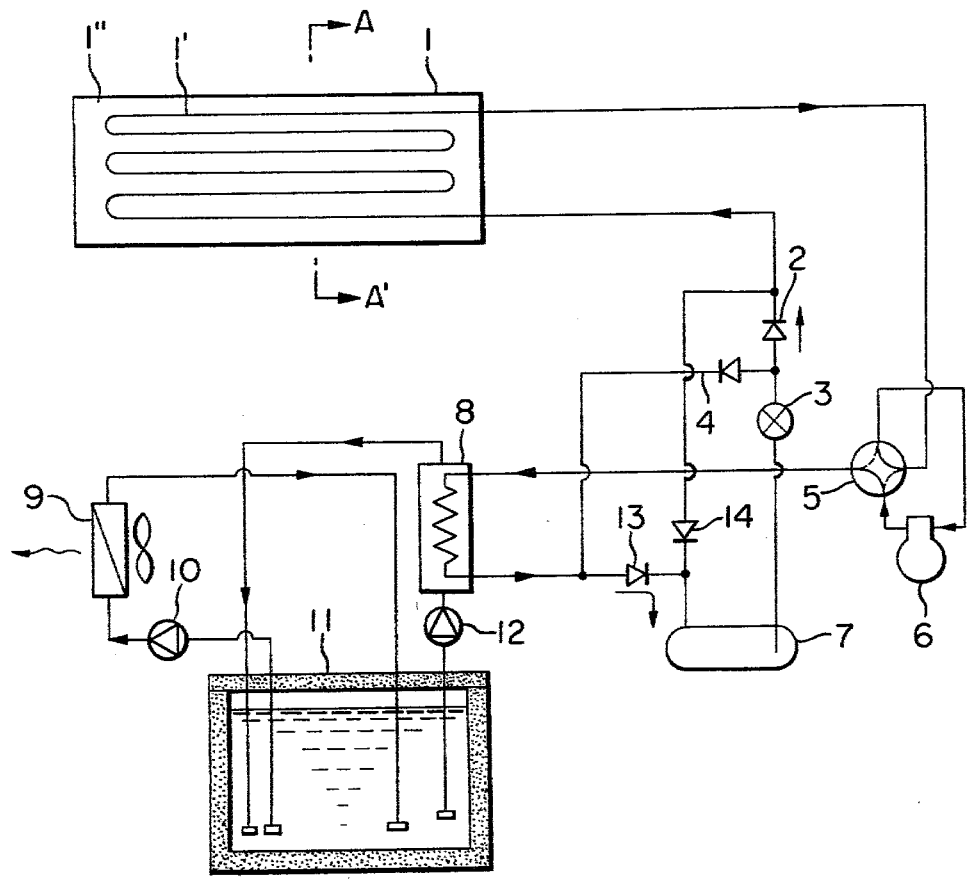
FIG. 1 is a piping diagram of a preferred embodiment of the system according to the present invention.

FIG. 1 shows diagrammatically an application of a preferred embodiment of the heating and cooling source system of heat pump type according to the present invention to an air conditioning system for a house. In FIG. 1, the arrows indicate the heating cycle of the heat pump.

Figure 2:
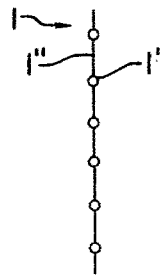
FIG. 2 is a schematic sectional view taken along the line AA' in FIG. 1 to show the structure of a heat collecting and radiating plate.
Figure 3:
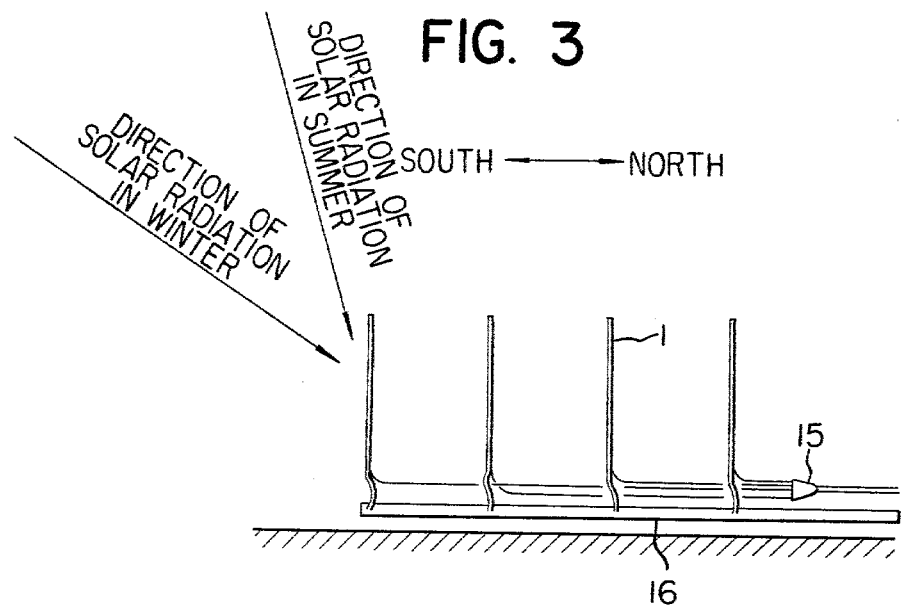
FIG. 3 is a schematic side elevation view showing a plurality of heat collecting and radiating plates disposed substantially normal to the horizontal.
Figure 4:
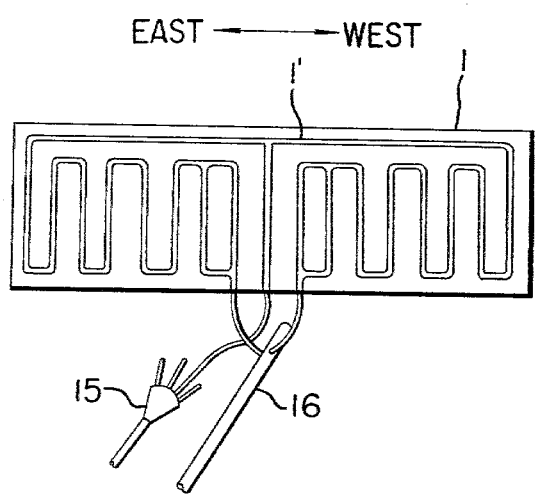
FIG. 4 is a front elevation view of FIG. 3.

Referring to FIG. 1, the system includes at least one heat collecting and radiating panel or plate 1 which is disposed on the housetop or rooftop to stand substantially normal to the horizontal as shown in FIG. 3. This heat collecting and radiating plate 1 is preferably of the sheetand-tube type which can be produced with good productivity, and the so-called roll-bond method on aluminum sheets is especially preferred for mass production of the plates at a low cost. The heat collecting and radiating plate 1 comprises refrigerant circulating tube portions 1' and fin portion 1" as seen in FIG. 2. A refrigerant such as a type of Freon is circulated through a compressor 6 and conduits while being suitably changed over in its path by a 4-way valve 5, so as to perform the heat absorption cycle in which the temperature of the plate 1 is lower than the outdoor air temperature to absorb heat from ambient air and the heat radiation cycle in which the temperature of the plate 1 is higher than the outdoor air temperature to release heat to ambient air. As in a usual system, the system of the present invention includes check valves, 2, 4, 13 and 14, an expansion valve 3, and a refrigerant receiver 7. This Freon cycle is intended for heat exchange by a water-refrigerant heat exchanger 8. Hot water or cold water obtained as a result of the heat exchange in the heat exchanger 8 is fed by a pump 12 into a storage tank 11 to be stored therein and is pumped out at the desired time from the storage tank 11 by another pump 10 to be supplied to an indoor unit, for example, a radiator 9 in a room.

When, in the case of the heat absorption cycle, the evaporating temperature of Freon circulating through the heat collecting and radiating plate 1 is set at about $-10°$ C. to $20°$ C. considering the temperature of ambient air in the daytime in the winter season, heat can be theoretically collected at the ambient air temperature above $-10°$ C., and consequently, hot water at about $45°$ C. can be stored in the storage tank 11. On the other hand, in the case of the heat radiation cycle in the summer season, cold water can be sufficiently stored even at the ambient air temperature of about $30°$ C. when the condensing temperature of the refrigerant circulating through the heat collecting and radiating plate 1 is set at about $30°$ C. to $60°$ C. considering the ambient air temperature in the nighttime. The temperature of cold water thus stored can be set at, for example, $5°$ C. to $8°$ C. which is enough to serve the cooling purpose.

In general, when in the heat absorbtion cycle the temperature of the refrigerant medium does not substantially exceed the air temperature surrounding the plate member, so as to absorb the solar heat and the air heat. In the heat radiation cycle the temperature of the refrigerant medium exceeds the air temperature so as to discharge heat from the plate member by connection to the surrounding air and by low temperature radiation.

Highly efficient operation can be carried out by radiating heat to the outdoor mainly in the nighttime to thereby store cold water and using the cold water for the cooling purpose in the daytime. Impossibility of cooling in the summer season can be obviated since heat can be radiated to the outdoor even in the daytime when the temperature of water stored in the storage tank 11 rises.

FIG. 3 shows a plurality of heat collecting and radiating plates 1 disposed in parallel with one another on the housetop or rooftop to stand substantially normal to the horizontal. A refrigerant distributor 15 and header 16 are shown connected to these plates 1. The surface of these heat collecting and radiating plates 1 is treated with a coating material such as white or black paint which improves the effect of heat radiation. As described previously, this improved effect of heat radiation refers to facilitation of absorption of solar radiation and heat from heat sources on the ground during the heat absorption cycle and to a better rate of radiation of infrared rays from the heat collecting and radiating plates 1 themselves during the heat radiation cycle. For example, black or similar coating is suitable for the dual purpose of heat absorption and heat radiation since it exhibits a high heat absorption rate (= heat radiation rate) of the order of 0.9 in both the visible and infrared spectrum ranges. On the other hand, white or similar coating is suitable for the exclusive purpose of heat radiation since it exhibits a low heat absorption (radiation) rate of the order of 0.1 to 0.2 in the visible spectrum range and a high heat absorption (radiation) rate of the order of 0.9 equivalent to that of the black coating in the infrared spectrum range. Further, the surface of the heat collecting and radiating plates 1 on the solar radiation receiving side may have a black coating, and the opposite surface may have a white coating. In lieu of applying the coating material, the surface of the heat collecting and radiating plates 1 may be colored by chemical treatment. Such surface treatment is essentially required since the bright metal surface of, for example, aluminum exhibits a low rate of heat absorption and radiation of the order of 0.1 in both the visible and infrared spectrum ranges, and therefore, the ability of heat exchange utilizing the radiation is reduced.

The heat collecting and radiation plates 1 are oriented to extend from east to west while standing substantially normal to the horizontal, so that continuous absorption of the energy of solar radiation can be effected from the morning to the evening in the winter season in which the altitude of the sun is low, and the energy of solar radiation falling upon the heat collecting and radiating plates 1 can be reduced in the in the summer season in which the altitude of the sun is high. Thus, when the heat collection and radiating plates 1 disposed and treated in the manner above described are used in areas of intermediate latitudes, the energy of solar radiation can be sufficiently absorbed in the daytime to effect heating in the winter season and the heat can be radiated in the nighttime from the plates to the outdoor to effect cooling in the summer season. The heat can be sufficiently radiated to the outdoor even in the daytime in the summer season in such areas since the plates will not be heated excessively. In the case of areas of low latitudes, cooling is chiefly required, and the system operates for the exclusive purpose of radiating heat to the outdoor. This radiation of heat is mainly carried out in the nighttime, and the cold water stored in the storage tank 11 used for cooling. The radiation of heat to the outdoor in the daytime is possible even when the amount of stored coldness is insufficient, since the altitude of the sun is high in these low-latitude areas, and the rays of solar radiation pass between the heat collecting and radiating plates 1 substantially in parallel therewith without excessively heating the same. In the case of areas of high latitudes, heating is chiefly required, and the system operates for the exclusive purpose of absorbing heat. In these areas, the solar radiation may fall upon the heat collecting and radiating plates 1 at an angle close to the right angle. However, these plates 1 would not be heated excessively, since, in these areas, the outdoor air temperature is generally low and the solar radiation is also weak.

Figure 5:
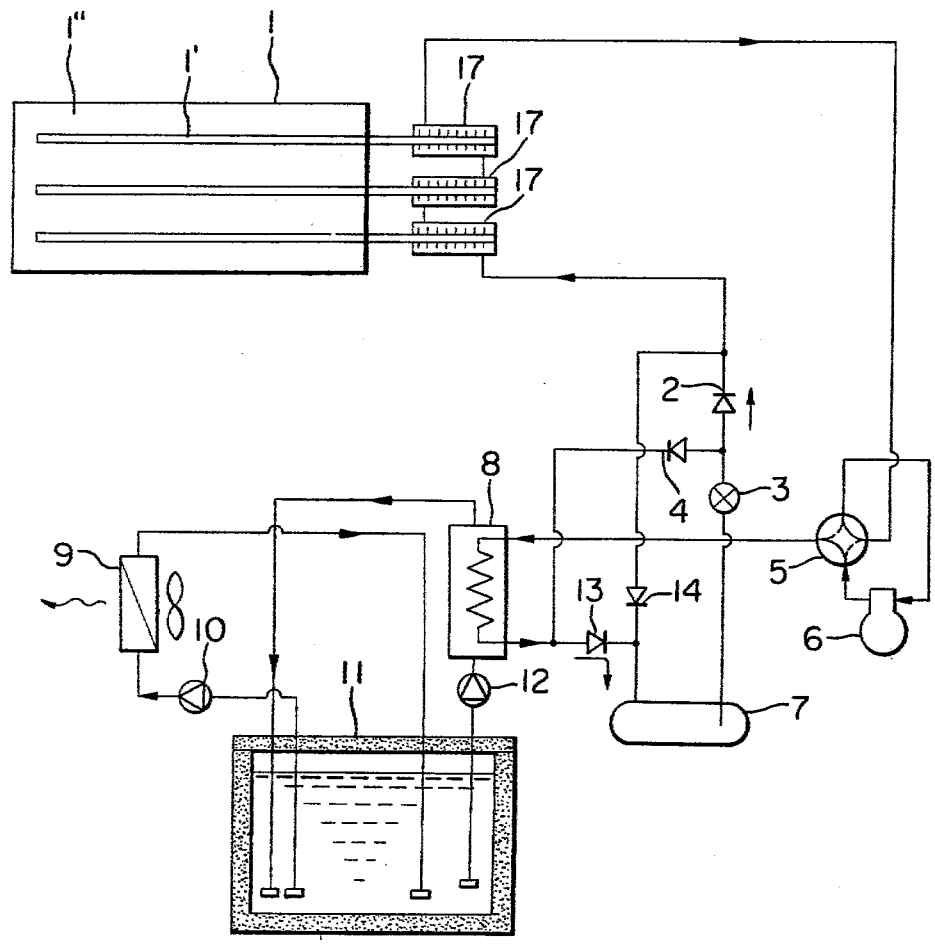
FIG. 5 is a view similar to FIG. 1, but showing a modification of the system according to the present invention.

A modification of the system of the present invention is shown in FIG. 5. In this modification, the refrigerant supplied by the heat pump circuit is circulated to the heat collecting and radiating plate 1 after heat exchange in heat exchangers 17 instead of being directly circulated to the heat collecting and radiating plate 1. More precisely, the heat pump circuit is connected to the heat tubes 1' through the heat exchangers 17. In this case too, heat is transferred by the refrigerant in the heat tubes 1' utilizing the latent heat.

Figure 6:
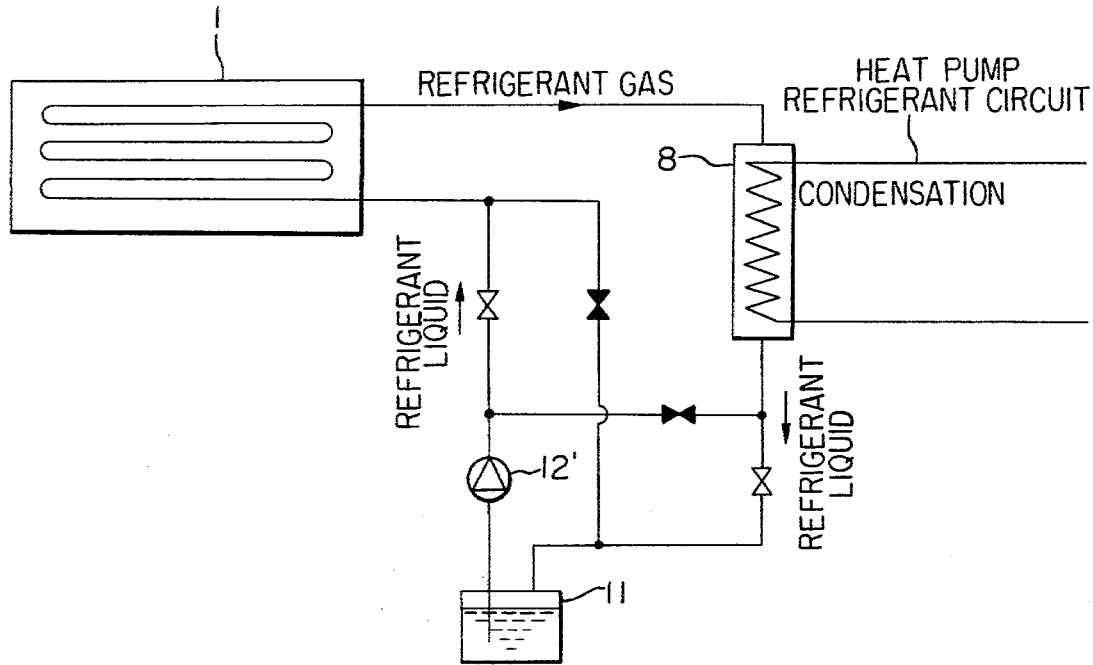
FIG. 6 is a piping diagram showing the heat absorption cycle in another modification of the system according to the present invention.
Figure 7:
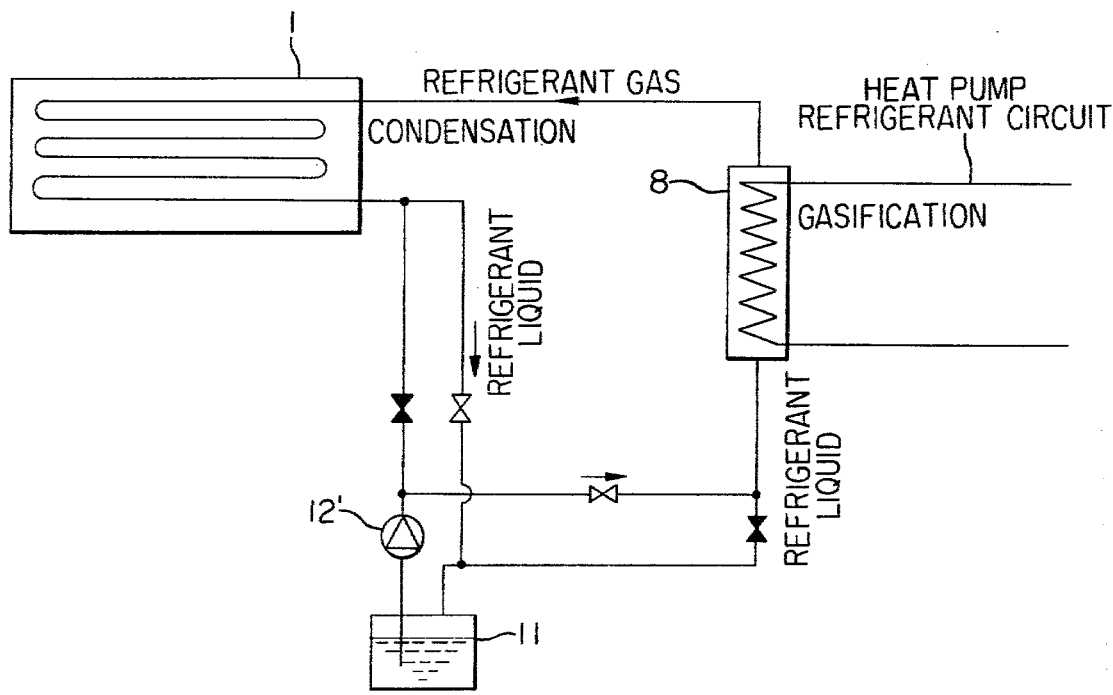
FIG. 7 is a piping diagram showing the heat radiation cycle in the modification shown in FIG. 6.

FIGS. 6 and 7 show another modification of the system of the present invention. In this modification, a liquid refrigerant such as Freon (R-12) is forcedly circulated by a refrigerant circulating pump 12'. In FIG. 6 showing the heat absorption cycle, the refrigerant in liquid form is pumped out of a storage tank 11 by the refrigerant circulating pump 12' to be fed into the heat collecting and radiating plate 1, and the greater portion of the refrigerant is gasified while leaving a portion non-gasified without affecting the operation. The gasified refrigerant is fed into a heat exchanger 8 of the heat pump circuit to be liquefied again to provide heat for the heat pump. FIG. 7 shows the heat radiation cycle in which the flow of the refrigerant is reversed relative to that illustrated in FIG. 6.

While preferred embodiments of the present invention have been described in detail hereinbefore, it is apparent that the present invention is in no way limited to such specific embodiments, and various changes and modifications may be made therein without departing from the spirit of the present invention. For example, the present invention is applicable not only to the air conditioning above referred to but also to heating of water in a heated swimming pool, melting of snow, cold storage of foodstuffs, etc.

I claim:

1. A heat pump type heating and cooling source system comprising a primary refrigerant medium circulating circuit utilizing the latent heat of the refrigerant medium, a secondary medium circulating circuit arranged for heat exchange relation with said primary medium circulating circuit and including a utility unit for heating and cooling purposes and at least one heat collecting and radiating member in panel form connected in said primary refrigerant medium circulating circuit, said heat collecting and radiating member being disposed outdoors substantially normal to the horizontal and capable of absorbing heat through solar radiation and from the atmosphere and capable of discharging heat to the atmosphere, the said primary refrigerant medium circulating in said system for winter heating purposes in the said member at an evaporating temperature of from about $-10°$ C. to $20°$ C. when the cold ambient air is above $-10°$ C. whereby said primary refrigerating medium absorbs solar radiation and heat from the atmosphere and the said primary refrigerant medium circulating in said system for summer cooling purposes at a condensing temperature of from $30°$ C. to $60°$ C. when the air temperature is up to about $30°$ C. whereby said primary refrigerating medium discharges heat through said member to the atmosphere, the said primary refrigerant medium constituting essentially the sole fluid means in the system for absorbing heat from and releasing heat to the outdoors.

2. A heat pump type heating and cooling source system as claimed in claim 1, wherein said heat collecting and radiating member is subjected to surface treatment with a material which improves the rate of heat radiation.

3. A heat pump type heating and cooling source system as claimed in claim 2, wherein said heat collecting and radiating member is oriented to extend substantially from east to west.

4. The system of claim 1 wherein said primary refrigerant medium constitutes essentially the sole fluid means in the system for absorbing heat from the releasing heat to the outdoors.

5. The heat pump type heating and cooling source system of claim 1 wherein for heating purposes the path of refrigerant in the system consists of the refrigerant exiting a receiver for said refrigerant, then passing to an expansion valve adapted to allow expansion of the refrigerant, then to the said panel for adsorption of solar radiant and atmospheric heat by the refrigerant, then to a compressor for compressing the refrigerant, then to a heat exchanger for cooling the refrigerant and heating a heat exchange fluid and thence back to the said receiver; and wherein for cooling purposes, the path of the refrigerant in the system consists of refrigerant exiting a receiver for said refrigerant, then passing to the expansion valve, then to the heat exchanger for heating the refrigerant and cooling a heat exchange fluid, then to the compressor, then to said panel for discharge of heat and thence back to the refrigerant receiver.

* * * * *